(12) United States Patent
Petersen et al.

(10) Patent No.: US 12,071,003 B2
(45) Date of Patent: Aug. 27, 2024

(54) FUEL SYSTEM WITH NECK SUPPORT DEBRIS MITIGATION

(71) Applicant: Agility Fuel Systems LLC, Costa Mesa, CA (US)

(72) Inventors: Erik Petersen, Lincoln, NE (US); Ryan Meston, Lincoln, NE (US); Chris Forsberg, Kelowna (CA); Andrew Taylor Gordon, Kelowna (CA); Adam Robertson, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 451 days.

(21) Appl. No.: 17/595,455

(22) PCT Filed: May 29, 2020

(86) PCT No.: PCT/US2020/035382
§ 371 (c)(1),
(2) Date: Nov. 17, 2021

(87) PCT Pub. No.: WO2020/243611
PCT Pub. Date: Dec. 3, 2020

(65) Prior Publication Data
US 2022/0234439 A1    Jul. 28, 2022

Related U.S. Application Data

(60) Provisional application No. 62/855,572, filed on May 31, 2019.

(51) Int. Cl.
*B60K 15/03* (2006.01)
*B60K 15/07* (2006.01)
*B60K 15/063* (2006.01)

(52) U.S. Cl.
CPC ........ *B60K 15/07* (2013.01); *B60K 15/03006* (2013.01); *B60K 2015/03118* (2013.01); *B60K 2015/0638* (2013.01)

(58) Field of Classification Search
CPC ........ B60K 2015/03118; B60K 15/067; B60K 15/063; B60K 2015/0638; B60K 2015/0675; B60K 15/07
See application file for complete search history.

(56) References Cited

U.S. PATENT DOCUMENTS

| 1,584,313 A | 5/1926 | Mallory |
| 1,758,613 A | 5/1930 | Markle |

(Continued)

FOREIGN PATENT DOCUMENTS

| CN | 2713283 | 7/2005 |
| CN | 201317264 | 9/2009 |

(Continued)

OTHER PUBLICATIONS

U.S. Appl. No. 14/170,383, Modular Fuel Storage System, filed Jan. 31, 2014.

(Continued)

*Primary Examiner* — Stephen J Castellano
(74) *Attorney, Agent, or Firm* — Knobbe, Martens, Olson & Bear, LLP

(57) ABSTRACT

A fuel system is provided that includes a mounting block assembly configured to support an end of a fuel tank. The end of the fuel tank has a boss. The mounting block assembly encloses a space configured to receive the boss of the fuel tank. The fuel system also includes a bearing disposed in the space. The bearing has a support surface configured for sliding support of the boss of the fuel tank at an interface between the first portion and the second portion of the mounting block assembly. The mounting block assem- (Continued)

bly has a debris mitigation structure, such as one or more of a wiper disposed in the bearing adjacent to the support surface, an endcap configured to be mounted around the boss, and a cover configured to at least partially enclose a span of a boss between an enclosed space of the fuel tank and an inboard side of the mounting block assembly.

20 Claims, 16 Drawing Sheets

(56) References Cited

U.S. PATENT DOCUMENTS

| | | | |
|---|---|---|---|
| 2,637,573 | A | 5/1953 | Cochrane |
| 3,294,225 | A | 12/1966 | Kenyon |
| 3,826,474 | A | 7/1974 | Pareja |
| 4,357,027 | A | 11/1982 | Zeitlow |
| 4,784,399 | A | 11/1988 | Finn |
| 4,899,901 | A | 2/1990 | Nickel |
| 5,149,041 | A | 9/1992 | Hartke |
| 5,154,556 | A | 10/1992 | Wappel |
| 5,165,700 | A | 11/1992 | Stoll et al. |
| 6,065,915 | A | 5/2000 | Ruehl et al. |
| 6,340,093 | B1 | 1/2002 | Zapp |
| 6,536,722 | B2 | 3/2003 | Sadowski et al. |
| 6,692,028 | B2 | 2/2004 | Koster |
| 6,708,719 | B2 | 3/2004 | Idoguchi |
| 6,843,237 | B2 | 1/2005 | Bowen et al. |
| 7,137,474 | B2 | 11/2006 | Yokote |
| 7,189,040 | B2 | 3/2007 | Sharp |
| 7,543,667 | B2 | 6/2009 | Hwang et al. |
| 8,051,879 | B2 | 11/2011 | Zeyfang |
| 8,545,147 | B2 | 10/2013 | Strang |
| 8,925,756 | B2 | 1/2015 | Tarapata et al. |
| 9,388,942 | B2 | 7/2016 | Sloan et al. |
| 9,457,652 | B2 | 10/2016 | Sloan et al. |
| 9,873,323 | B2 | 1/2018 | Stahl |
| 9,884,552 | B2 * | 2/2018 | Sloan .................... F17C 13/083 |
| 9,914,355 | B2 | 3/2018 | Sloan et al. |
| 10,144,280 | B2 | 12/2018 | Sloan et al. |
| 10,195,937 | B2 | 2/2019 | Sloan et al. |
| 10,274,134 | B2 | 4/2019 | Sloan et al. |
| 10,661,954 | B2 | 5/2020 | Fresnel |
| 11,260,744 | B2 * | 3/2022 | Volkmer ................. F02D 41/22 |
| 2005/0169724 | A1 | 8/2005 | Sharp et al. |
| 2007/0046066 | A1 | 3/2007 | Cosgrove et al. |
| 2010/0078244 | A1 | 4/2010 | Pursifull |
| 2012/0174371 | A1 | 7/2012 | Koehnan et al. |
| 2013/0001384 | A1 | 1/2013 | Karlsson et al. |
| 2014/0061266 | A1 * | 3/2014 | Milton ............. B60K 15/03006 224/404 |
| 2014/0217107 | A1 | 8/2014 | Sloan et al. |
| 2019/0047411 | A1 | 2/2019 | Kataoka et al. |
| 2022/0410700 | A1 | 12/2022 | Cederberg et al. |

FOREIGN PATENT DOCUMENTS

| | | |
|---|---|---|
| CN | 207064081 | 3/2018 |
| DE | 10 2012 011612 A1 | 1/2013 |
| DE | 10 2015 009032 | 1/2017 |
| EP | 1 513 715 | 8/2016 |
| JP | H09-315433 A | 12/1997 |
| JP | 2008-254819 A | 10/2008 |
| JP | 2011-126566 A | 6/2011 |
| KR | 100925937 B1 | 11/2009 |
| WO | WO 2014/121140 A1 | 8/2014 |
| WO | WO 2017/027478 A1 | 2/2017 |
| WO | WO 2020/243611 | 12/2020 |

OTHER PUBLICATIONS

U.S. Appl. No. 15/182,451, Modular Fuel Storage System, filed Jun. 14, 2016.
U.S. Appl. No. 16/379,513, Modular Fuel Storage System, filed Apr. 9, 2019.
U.S. Appl. No. 15/230,311, Modular Fuel Storage System, filed Aug. 5, 2016.
U.S. Appl. No. 16/227,879, Modular Fuel Storage System, filed Dec. 20, 2018.
European search report dated Oct. 12, 2016 for EP2951043.
European search report with opinion dated Jan. 13, 2017 for EP2951043.
International search report and written opinion dated May 14, 2014 for PCT/US2014/014297.
International search report with written opinion dated Oct. 14, 2016 for PCT/US2016/046066.
International Search Report and Written Opinion issued in PCT Application No. PCT/US2020/035382, dated Aug. 24, 2020 in 20 pages.

* cited by examiner

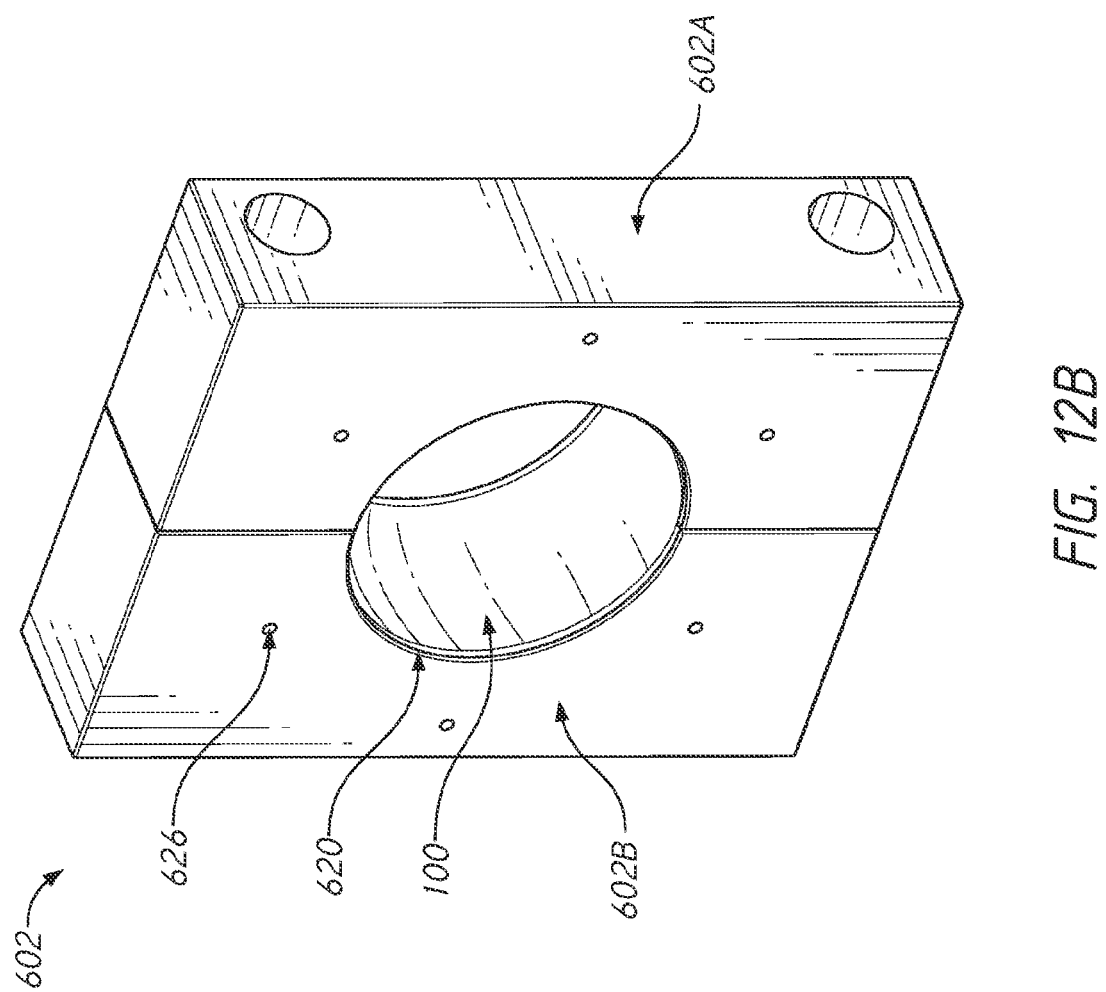

FUEL SYSTEM WITH NECK SUPPORT DEBRIS MITIGATION

CROSS-REFERENCE TO RELATED APPLICATIONS

This application is a U.S. National Phase under 35 U.S.C. § 371 of International Application No. PCT/US2020/035382, filed May 29, 2020, which claims priority to U.S. Provisional Application No. 62/855,572, filed May 31, 2019. Each of the foregoing applications is hereby incorporated by reference herein in its entirety.

BACKGROUND OF THE INVENTION

Field of the Invention

This application relates to fuel systems that have fuel tanks supported at a neck portion and to components and sub-assemblies therefor.

Description of the Related Art

Compressed natural gas (CNG) is an alternative fuel that provides many advantages. CNG fuels burn cleaner than other combustion fuels. CNG also can be more cost effective.

CNG fuel systems can come in several forms. One form employs a Type IV fuel tank constructed with a polymeric liner. Carbon fiber wrapped around the liner can reinforce the liner, to produce a fuel tank strong enough for use on heavy-duty trucks and other vehicles. The fuel tank can have a boss disposed at one or more ends for sealing the end portion(s) of the fuel tank. The boss can provide access to the fuel tank for filling and dispensing the fuel contained therein. The fuel tank can be integrated into a fuel system that includes a frame to support the fuel tank. The frame can support the fuel tank on a side or lateral portion of a vehicle, behind the cab of the vehicle, on a rooftop of the vehicle, or at another location. Some fuel tanks can be supported at one or both ends at the bosses.

SUMMARY OF THE INVENTION

Fuel tanks that are supported at one or more bosses can be subject to wear at the interface between the boss and the support. For example, in some cases it is observed that the fuel tank can expand and contract by small but significant amounts in a lengthwise direction. The expansion and contraction can be due to conditions such as the level of pressure in the tank, the temperature of the tank, the ambient temperature and other surrounding environmental conditions, or loading of the fuel tank. The expansion and contraction can cause relative sliding motion that can result in wear on the fuel tank, e.g., on a surface of the boss. While the fuel tank can be configured for a long service life accounting for wear, it would be an advantage to reduce fuel tank wear for a number of reasons, such as reducing maintenance and repair costs and preventing sudden material failure.

In one embodiment, a fuel system is provided that includes a tank, a mounting assembly, a first bearing block, and a second bearing block. The tank has a first boss at one end and a second boss. The second boss is located at an end of the tank opposite the first boss. The mounting assembly is configured to be coupled to a support. For example, the mounting assembly can be directly coupled to a vehicle, such as to a frame rail or can be indirectly coupled to a frame rail or a chassis portion of a vehicle by one or more other brackets or structural members. The mounting assembly can be configured to be coupled to a trailer or a stationary storage facility. The first bearing block is coupled to the mounting assembly. The first bearing block has a first inner portion comprising a first tank support surface and a wiper disposed adjacent to the first tank support surface. The second bearing block is coupled to the mounting assembly. The second bearing block has a second inner portion comprising a second tank support surface. The first bearing block being coupled to an outer surface of the first boss at the first tank support surface to form a first support connection. The second bearing block being coupled to an outer surface of the second boss at the second tank support surface to form a second support connection. The first and second support connections support the tank on the mounting assembly. The first bearing block allow the first boss to move relative to the first tank support surface while the tank is coupled to the mounting assembly. The wiper prevents debris from entering a space disposed between the first tank support surface and the first boss when the first boss move relative to the first support surface.

In another embodiment, a fuel system is provided that includes a mounting block assembly configured to support an end of a fuel tank. The end of the fuel tank has a boss. The mounting block assembly has a first portion and a second portion. The second portion is separable from the first portion. The first portion and the second portion enclose a space configured to receive the boss of the fuel tank. The fuel system also includes a bearing disposed in the space. The bearing has a support surface configured for sliding support of the boss of the fuel tank at an interface between the first portion and the second portion of the mounting block assembly. The bearing has an inboard facing surface. The inboard facing surface faces the end of the fuel tank when the fuel tank is supported by the mounting block assembly. The bearing has a wiper disposed adjacent to the support surface.

In another embodiment, a neck mount support assembly is provided that includes a mounting block assembly that is configured to support an end of a fuel tank. The end of the fuel tank has a boss. The mounting block assembly has a first portion and a second portion separable from the first portion. The first portion and the second portion enclose a space configured to receive the boss of the fuel tank. A bearing is disposed in the space. The bearing has a support surface configured for sliding support of the boss of the fuel tank at an interface. The mounting block has a wiper disposed adjacent to the support surface of the bearing. The wiper is configured to limit debris from entering the interface between the support surface and the boss.

In another embodiment a neck mount support assembly is provided that includes a mounting block and an end cap. The mounting block can be configured to support an end of a fuel tank, e.g., an end having a boss. The mounting block has a first portion and a second portion separable from the first portion. The first portion and the second portion enclose a bearing support space configured to receive the boss of the fuel tank. A bearing can be or is disposed in the bearing support space. The bearing has a support surface configured to support the boss of the fuel tank at an interface. The endcap can be connected to an outboard side of the mounting block opposite the side of the mounting block configured to face the fuel tank. The endcap can be configured to limit debris from entering the interface between the support surface and the boss.

In one variation, the neck mount support assembly can include a debris exclusion component on an inboard side of the mounting block facing the fuel tank. The debris exclusion component can include a cover. The cover can be connected to a first side of the mounting block. The first side can be the inboard side of the mounting block. The cover can be configured to limit debris from entering the interface between the support surface and the boss.

A cover, if provided, can span a length of the boss between the mounting block and the fuel tank enclosure. The cover can be secured to an outer surface of the fuel tank assembly.

A debris exclusion component on an inboard side of the neck mount support assembly can include a wiper disposed in mounting block, e.g., between the bearing and the boss. The wiper can be used alone or in combination with a cover that can cooperate to exclude debris from entering the interface between the bearing and the boss.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

FIG. 12B is a perspective view of an outboard side of one embodiment of a mounting block.

DETAILED DESCRIPTION OF THE PREFERRED EMBODIMENT

This application is directed to reducing ingress of debris, such as sand, dust and grit, into an interface that is provided between an outside surface of a neck portion of a fuel tank and a surface applying a load to the outside surface. The outside surface may be a cylindrical surface of a boss and the load applying surface may be a bearing or a component of a mounting block or mounting block assembly configured to support at least a portion of the weight of the tank. The ingress of such matter can produce wear at the neck portion of the fuel tank. Neck portion wear can lead to accelerated wear of the fuel tank or fuel system in which the tank is integrated, and/or to maintenance concerns of the fuel tank and/or fuel system. The incidence and severity of these outcomes can be reduced or eliminated by embodiments disclosed herein.

Figure 1:
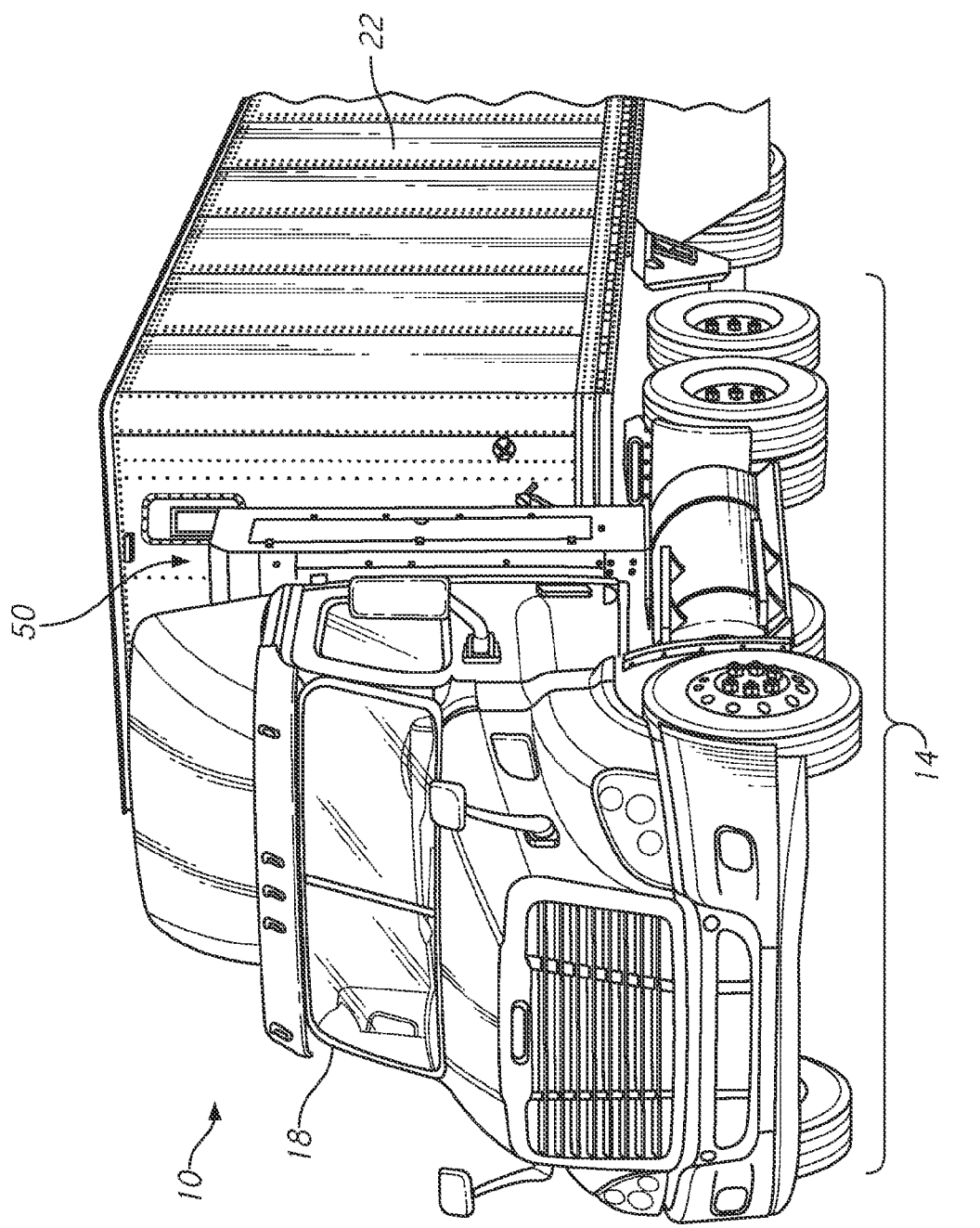
FIG. 1 is a perspective view of a tractor-trailer with a cab that has a fuel system disposed behind the cab.
Figure 2:
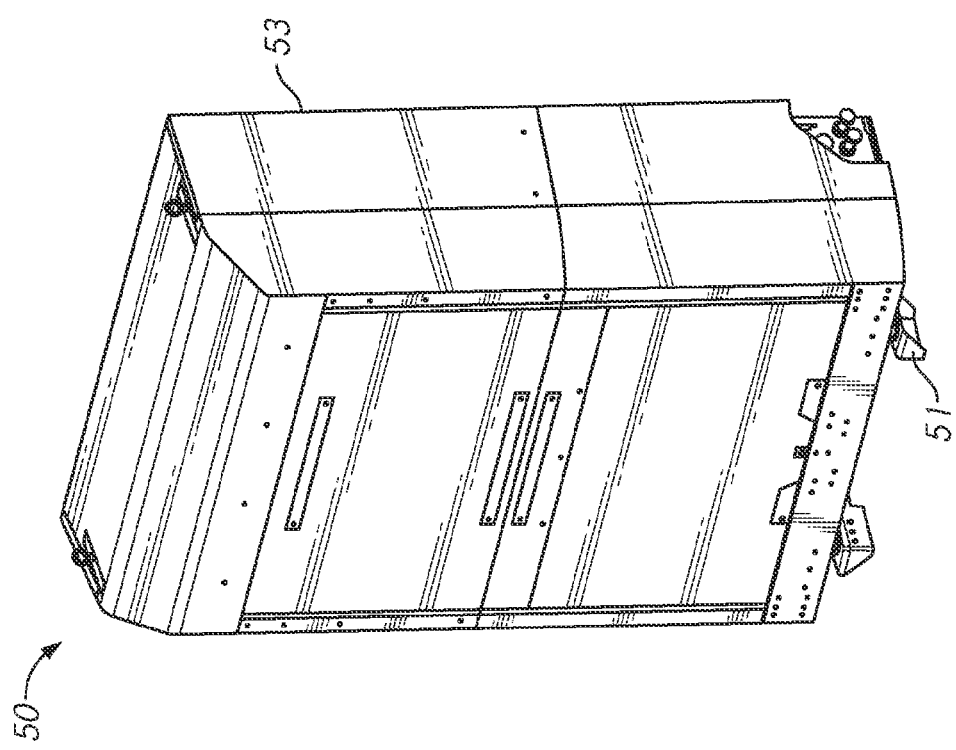
FIG. 2 is a perspective view of a fuel system mountable behind the cab of the tractor-trailer shown in FIG. 1, the fuel system having one or more fuel tanks disposed therein.

FIGS. 1 and 2 illustrate environments in which embodiments herein can be deployed. In one example, a fuel system 50 can be coupled with a vehicle 10 to provide the fuel needs therefor. In various embodiments, a vehicle 10 may refer to any mobile machine or device, including trailers and other towable assemblies, designed or used to transport passengers or cargo, including fuel. Examples of a vehicle may include cars, trucks, buses, trains, ships, boats, aircrafts and other types of vehicles as well as trailer and other component that can be towed by or coupled to any of the foregoing. More generally, the fuel system 50 could be part of a stationary facility for storage of fuel and/or for refueling a fleet. The vehicle 10 in FIG. 1 is a tractor-trailer. Classes of trucks that could benefit from the disclosed improvements herein include a light duty trucks (e.g., class 1, class 2 or class 3), medium duty trucks (e.g., class 4, class 5 or class 6), or heavy duty trucks (e.g., class 7 or class 8). Passenger vehicles, including cars, wagons, vans, buses, high-occupancy vehicles could employ the disclosed improvements as well. The vehicle 10 can be any vehicle, as discussed above, but is illustrated as a tractor-trailer with a cab 18 and a detachable portion 22, i.e., the trailer. The fuel system 50 is disposed between the cab 18 and the detachable trailer 22 but could be in other locations in other fuel systems. The connection to the vehicle 10 can be by way of mounting brackets 51 disposed on a lower portion of the fuel system 50. The fuel system 50 can include one or a plurality of fuel tanks 52 disposed in an enclosure 53. The fuel tanks 52 may be of any size, capacity, shape and/or weight and may be made of any suitable material. For example, the fuel tanks 52 may have a shape that is substantially cylindrical, rectangular, spherical, or the like. In addition, the fuel tank(s) 52 may be used to store any type(s) of fuel such as gaseous fuels (e.g., compressed natural gas) or a liquid (e.g., diesel). For example, gaseous fuels may include hydrogen or hydrogen based gas, hythane, H2CNG, or any other gas. The enclosure 53 can be mounted to a structure, e.g., to a support frame of the fuel system 50.

In one embodiment, the fuel system 50 includes a mounting assembly 62 that can include or be supported by a frame 64. The mounting assembly 62 can include a block member(s) that receives and retains one or more boss members of the fuel tank 52. The mounting assembly 62 can be coupled to the mounting brackets 51, e.g., by the first boss 54 or by other frame members between the frame 64 and the mounting brackets 51.

Figure 3:
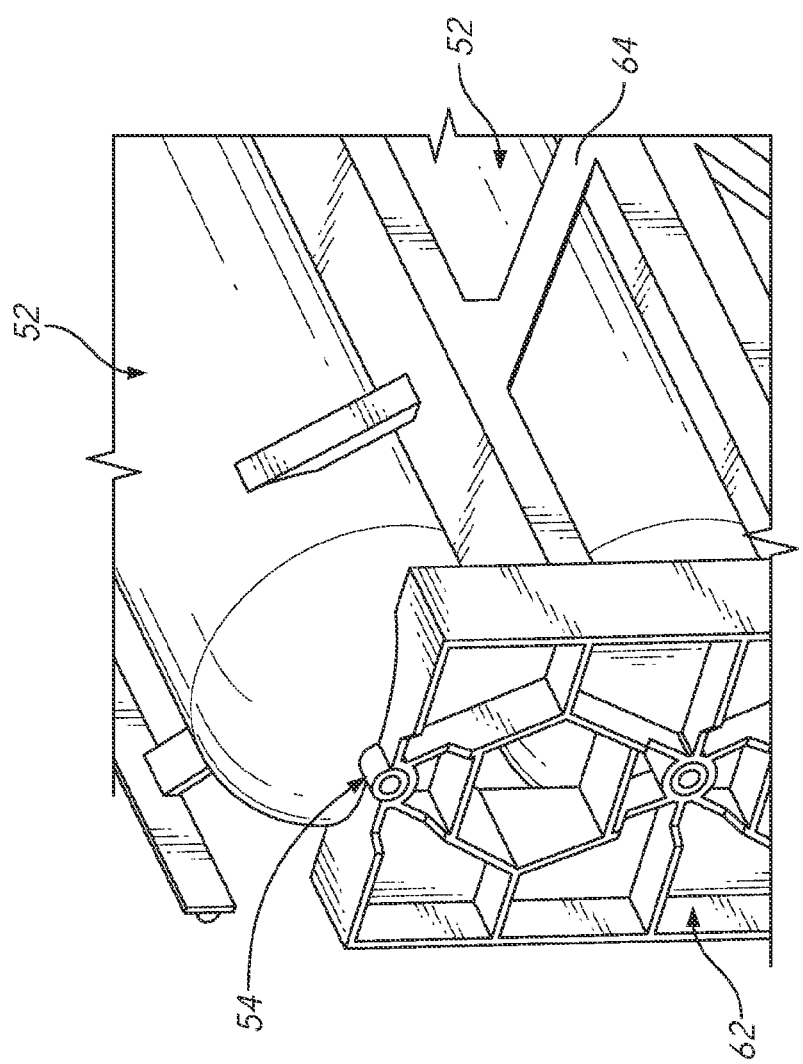
FIG. 3 is a detail view showing a mounting system for supporting neck portions of fuel tanks.
Figure 3A:
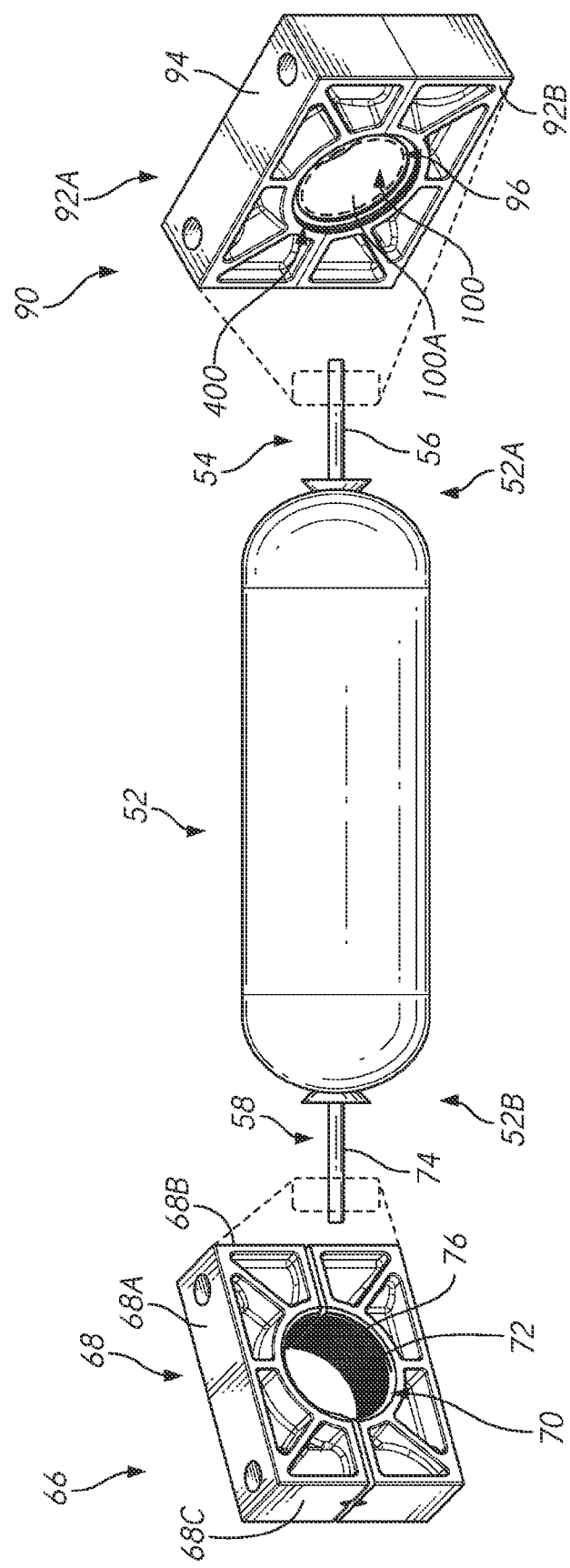
FIGS. 3A-3B are schematic views of fuel tank and mounting block assemblies that can be used to support the fuel tank while excluding debris from the assemblies.

FIGS. 3 and 3A show details of how the fuel tank 52 can be supported by the mounting assembly 62 and/or the frame 64 and/or block members as discussed further below. The fuel tank 52 includes a first end 52A and a second end 52B. A cylindrical portion is disposed between the first end 52A and the second end 52B. The cylindrical portion can account for the majority of the volume of the fuel tank 52. The ends of the fuel tank 52 can be enclosed by hemispherical dome members at the first end 52A and the second end 52B. A first boss 54 can be disposed at the first end 52A. A second boss 58 can be disposed at the second end 52B. Each boss can have an outer surface, e.g., the first boss 54 can have an outer surface 56 that is exposed and that is coupled to the mounting assembly 62 as discussed below.

FIG. 3A schematically shows how a fixed bearing block assembly 66 can be integrated into the mounting assembly 62 to support the fuel tank 52 at the second boss 58. The fixed bearing block assembly 66 can include a rigid block member 68. In one embodiment the fixed bearing block assembly 66 includes a two part assembly that includes two rigid block members 68. A first rigid block member 68 is disposed generally above the second boss 58 when applied and a second rigid block member 68 is disposed generally below the second boss 58. The two rigid block members 68 can be identical, such that each provides one half of an inner periphery 70 configured to be disposed about the second boss 58. In some embodiments the first and second rigid block members 68 have a "C" shape profile when separated. The "C" shape refers to one or each of the block members 68 having a convex surface, such as one-half or a portion of the inner periphery 70 and also having external sides disposed about the inner periphery 70 or portion thereof. Each block member 68 can have a first side or portion 68A of an outer periphery thereof disposed opposite the inner periphery 70. Each block member 68 can have a second 68B and third side 68C disposed opposite of each other and at opposite ends of the first side 68A. The two rigid block members 68 can be similar or identical such that each provides a similar or identical outer periphery configured to be secured to the frame 64 or other supporting structure within the mounting brackets 51 of the fuel system 50. Apertures in the outer periphery of the rigid block member(s) 68 can allow bolts or other fasteners to secure the two or more rigid block members 68 together. In another embodiment, the fixed bearing block assembly 66 is a single member with an aperture in a center thereof providing the inner periphery 70.

The inner periphery 70 can be provided with a boss engaging feature 72, which can be one or a plurality of inner threads 76. The inner threads 76 can be configured to mate with the second boss 58 to limit, reduce or eliminate relative movement between the second boss 58 and the fixed bearing block assembly 66. In one case, the second boss 58 comprises one or a plurality of outer threads 74 that can mate with the boss engaging feature 72, e.g., with the inner threads 76. In one case, the inner threads 76 are female threads and the outer threads 74 are male threads. In another case, the inner threads 76 are male threads and the outer threads 74 are female threads. In various embodiments, the shape and dimensions (e.g., diameter, length) of the inner periphery 70 may be configured to secure or protect the second boss 58. For example, where the cross-section of the second boss 58 is a circle, the shape of the inner periphery 70 may also be circular. In other embodiments the cross-intersection of the second boss 58 is a rectangle and the shape of the inner periphery 70 may resemble a rectangle.

As noted above, the fuel tank 52 can be somewhat expanded when under pressure in part due to the materials used to form the fuel tank 52. In some cases, a longer lasting fuel system 50 results from permitting the fuel tank 52 to expand while holding the fuel tank 52 in the fuel system 50. In one embodiment, a first bearing block assembly 90 is provided that is configured to permit some movement between the first boss 54 and an inner periphery 96 configured to be disposed around the first boss 54. The inner periphery 96 provides a bearing support space for supporting a bearing which actually contacts the first boss 54 as discussed further below. The first bearing block assembly 90 can be configured to be supported in the enclosure 53, e.g., being coupled with the mounting brackets 51 directly or through the frame 64.

FIG. 3A shows that the first bearing block assembly 90 can include a first block portion 92A and a second block portion 92B. The block portions 92A, 92B can be separable in a manner similar to the rigid block member 68 of the fixed bearing block assembly 66. The first block portion 92A can be lifted off of the second block portion 92B to provide access to an inner periphery 96 of the block portions 92A, 92B. The inner periphery 96 can be shaped and sized (e.g., diameter, length) in a variety of different ways. For instance, the inner periphery 96 can be circular, triangular, rectangular, pentagonal, hexagonal and octagonal. The inner periphery 96 can be shaped in many other configurations other than those previously listed. A bearing assembly 100 can be placed in the inner periphery 96 to provide support for the first boss 54. In some embodiments, a second bearing assembly 100 similar to the first bearing assembly 100 can be provided on the second boss 58. The first bearing assembly 100 can be secured in the inner periphery 96 in any suitable manner, such as by being received in a channel therein. In some embodiments, the bearing assembly 100 can be secured in place by a fastener, pin and key, latch, or other connector. In other embodiments, the bearing assembly can be secured in place through a more permanent method, such as through welding or bonding. In various embodiments, the shape and dimensions (e.g., diameter, length) of the bearing assembly 100 may be configured to secure to the inner periphery 96. For example, where the intersection of the inner periphery 96 is a circle, the shape of the bearing assembly 100 may resemble a circle. Where the intersection of the inner periphery 96 is a rectangle, the shape of the bearing assembly 100 may resemble a rectangle.

Figure 4:
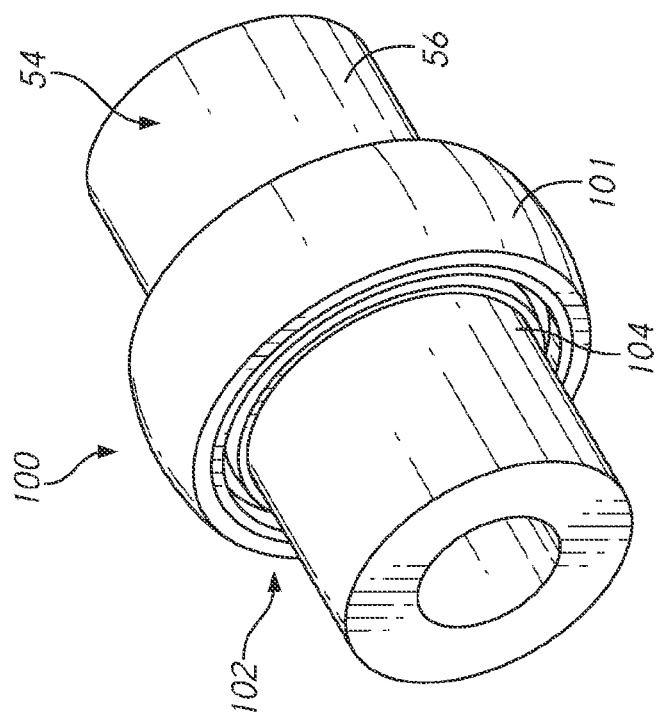
FIG. 4 is a perspective view illustrating an assembly including a neck boss component and a bearing assembly according to one example.
Figure 7:
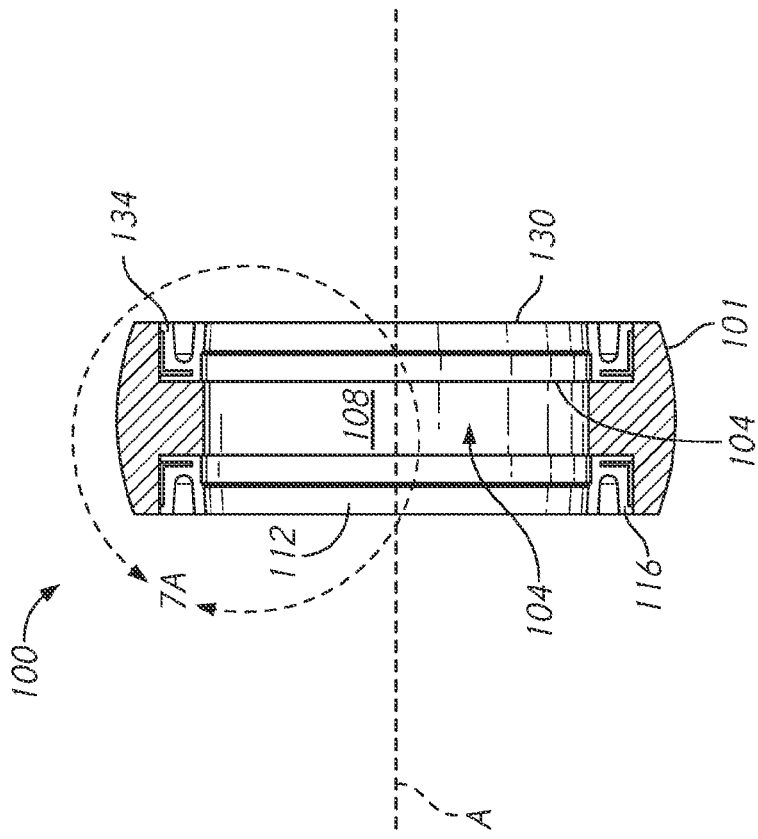
FIG. 7 is a cross-sectional view of a bearing assembly taken at section plane 7-7 in FIG. 6.

This connection can be more fully appreciated with reference to FIG. 4 in which the first bearing assembly 100 is shown positioned over the first boss 54. The first bearing assembly 100 can be seen to have a convex outer surface 101. The convex outer surface 101 can be convex in direction seen in a cross-section transverse, e.g., perpendicular to the opening through the first bearing assembly 100, as shown in FIG. 7. The convex surface can be received in a corresponding concave channel formed in the inner periphery 96 of the first bearing block assembly 90. FIG. 4 shows that a first support connection 102 is provided between the outer surface 56 of the first boss 54 and a first inner portion 104 of the first bearing assembly 100.

Figure 5:
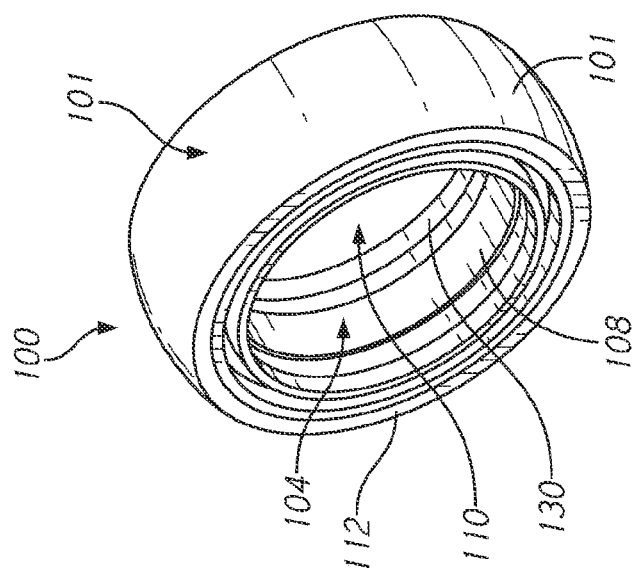
FIG. 5 is a perspective view of one embodiment of a bearing assembly that can be incorporated into a mounting block assembly.
Figure 6:
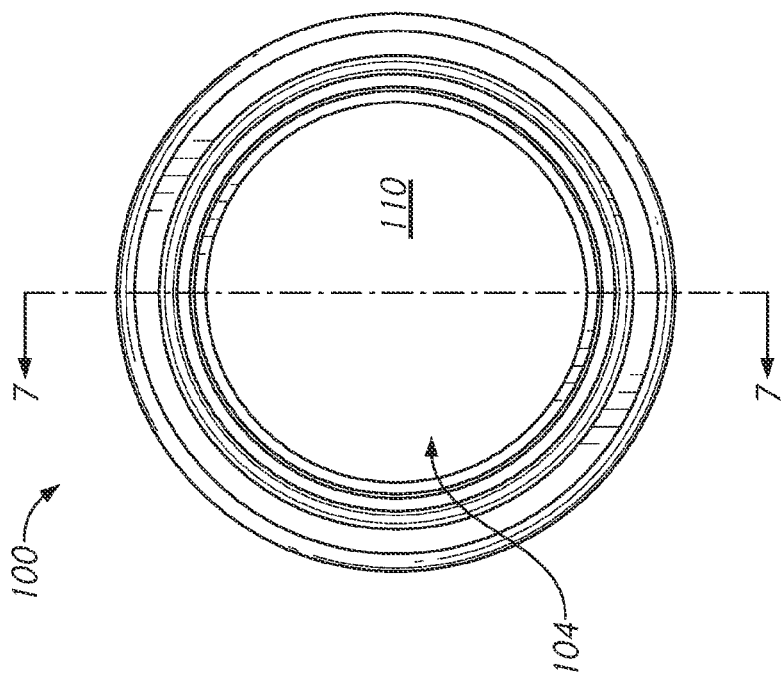
FIG. 6 is a side view of the bearing assembly of FIG. 5.

FIGS. 5-7 show the first bearing assembly 100 in more detail. The first bearing assembly 100 includes an aperture at the first inner portion 104. The aperture is sized to receive the outer surface 56 of the first boss 54. The aperture can allow a sliding connection to be formed in the first inner portion 104. The first inner portion 104 can include a first tank support surface 108. The first tank support surface 108 is configured for sliding support of the first boss 54 of the fuel tank 52 at an interface there between. The first tank support surface 108 can be a generally flat surface, e.g., forming a cylindrical portion that can be larger than the outer diameter of the outer surface 56 of the first boss 54. The first tank support surface 108 can be smooth, with a surface roughness value of anywhere between 0.025 micrometers to 100 micrometers, including about 0.05, 0.1, 0.2, 0.4, 0.8, 1.6, 3.2, 6.3, 12.5, 25, 50, and 100 micrometers. In some embodiments, the first tank support surface 108 contains bearings, such as a sleeve bearing, ball bearings or another suitable bearing. These bearings can be arranged in a ring or sleeve pattern on the first tank support surface 108.

The first tank support surface 108 can at least, in part, define a space 110 that is inward of the first tank support surface 108. The space 110 can be disposed between the first tank support surface 108 and the outer surface 56 of the first boss 54. The space 110 can be or can include a portion of an interface between the fuel tank 52 and the first bearing block assembly 90. The space 110 can benefit from the addition of a mechanism to exclude dirt, debris or other matter from the interface. By excluding such matter, the first bearing block assembly 90 and the fuel system 50 can have a longer service life, particularly in dirty environments in which heavy duty vehicles are used.

In one embodiment, the first bearing assembly 100 includes a wiper 112. The wiper 112 can be a first wiper 112 where the first bearing assembly 100 also includes a second wiper 130. The first wiper 112 can be an inboard wiper, e.g., one that is positioned between the space 110 and the cylindrical portion of the fuel tank 52. The first wiper 112 can be an outboard wiper, e.g., one that is positioned such that the block portions 92A, 92B are disposed between the first wiper 112 and the cylindrical portion of the fuel tank 52. The first wiper 112 can be outboard in the sense of being more laterally located on the fuel system 50.

The first wiper 112 and/or the second wiper 130 can be integrated into the first bearing assembly 100 in convenient manner such that they can be installed together with the first tank support surface 108, which is the surface that the outer surface 56 of the first boss 54 can rest upon. In one embodiment, the first bearing assembly 100 includes a ring member 100A that extends between the convex outer surface 101 and the first tank support surface 108. The ring member 100A can include a continuous monolithic structure from the convex outer surface 101 to the first tank support surface 108. The ring member 100A can be formed of a strong, substantially incompressible material. The ring member 100A can include a low friction material, at least adjacent to or at the first tank support surface 108. Some materials that can form the ring member 100A can include, for instance, metal (e.g., aluminum or steel), metal alloy (e.g., aluminum alloys), carbon fiber reinforced plastic, or a plastic material. The ring member 100A can be manufactured using a variety of different materials and methods. The ring member 100A may be made by any suitable process, such as, for instance, machining, milling, water jet cutting, laser cutting, stamping, pressing, sheet metal drawing, molding (e.g., injection molding), casting, rapid prototyping using additive manufacturing techniques, or any combination thereof. The ring member 100A can provide a first recess 116 disposed on a side surface thereof. The first recess 116 can be formed in the material of the ring member of the first bearing assembly 100 between the first tank support surface 108 and a lateral surface of the ring member 100A. A lateral surface in this context can be disposed in a plane perpendicular to an axis A through the first bearing assembly 100. The first recess 116 can correspond to an annular recess disposed between the material forming the first tank support surface 108 and the lateral edge of the ring member 100A of the first bearing assembly 100. The first wiper 112 can be installed in the first recess 116.

In one embodiment, the first wiper 112 has one or more, e.g., two faces that can be secured to the first recess 116. Any suitable approach can be provided to secure the first wiper 112 in the first recess 116. For example, an adhesive can be used to secure a first face of the first wiper 112 to a surface of the first recess 116. An adhesive can be used to secure a second face of the first wiper 112 to a surface of the first recess 116. When secured in the first recess 116, a free end of the first wiper 112 can be disposed in an opening through the first bearing assembly 100 that includes the space 110 disposed between the first tank support surface 108 and the axis A. For example, a free end of the first wiper 112 can be suspended at or adjacent to a lateral face of the ring member 100A of the first bearing assembly 100. The free end can comprise a free circumferential edge of the first wiper 112. The free end of the first wiper 112 can flare at least partially into the opening within the first bearing assembly 100. The free end of the first wiper 112 can flare toward the axis A and away from the first recess 116.

Figure 7A:
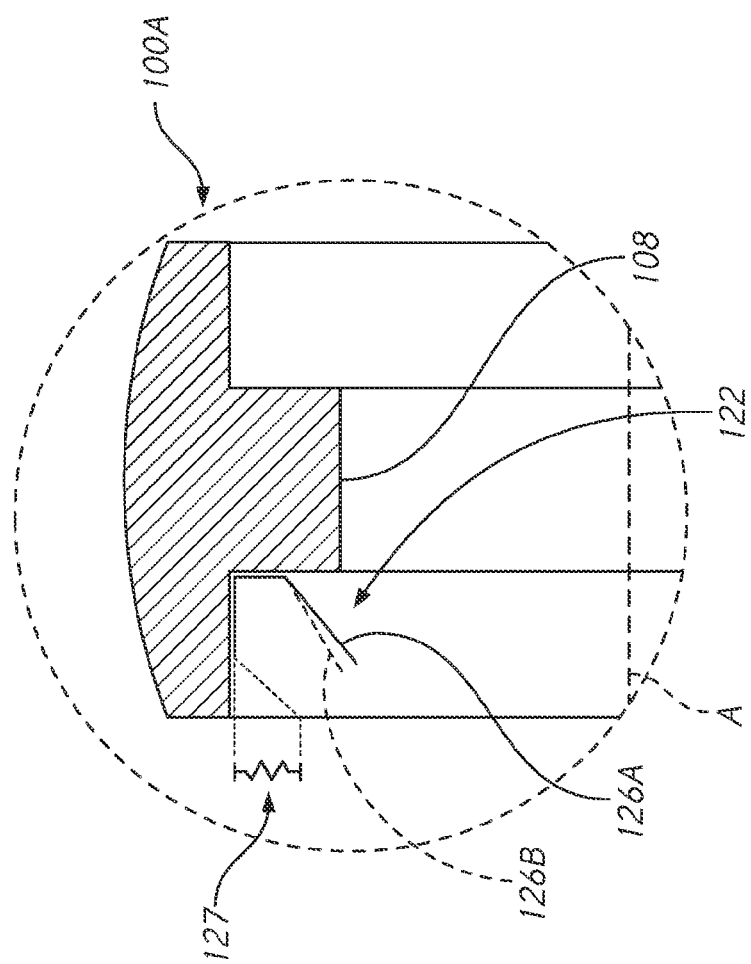
FIG. 7A is a detail view of the cross-sectional view of FIG. 7.

In some embodiments, the first wiper 112 can be resilient in structure or material. In some embodiments, the first wiper 112 can be made from a material, including rubber, silicone, metal, cork, neoprene, nitrile rubber, fiberglass, PTFE, plastic, or any combination thereof. The first wiper 112 can be manufactured by any suitable process, such as, for instance, machining, milling, water jet cutting, laser cutting, stamping, pressing, sheet metal drawing, molding (e.g., injection molding), casting, rapid prototyping using additive manufacturing techniques, or any combination thereof. The first wiper 112 can be configured such that a portion thereof, e.g, the free end thereof, can be disposed or urged toward the axis A in at least one configuration. The first wiper 112 can include a rubber ring member 120. The rubber material of the rubber ring member 120 can be springy or resilient such that upon being compressed the first wiper 112 applies a resisting force against the structure compressing the rubber ring member 120. In one case, the rubber ring member 120 includes an outer periphery 122 secured in the first recess 116 and an inner periphery 124 disposed toward the axis A. The outer periphery 122 can be disposed in a free state 126A toward the axis A by a first amount. The outer periphery 122 can be disposed in compressed state 126B toward the axis A by a second amount. The second amount can be less than the first amount, as shown in, for example, FIG. 7A. In some cases, the first wiper 112 is itself resilient. In other cases, a spring or other resilient member 127 can be disposed between the ring member of the first bearing assembly 100 and the first wiper 112 such that the first wiper 112 can be stiff but the resilient member 127 can act to press the first wiper 112 against the outer surface 56 of the first boss 54.

As discussed above, the first bearing assembly 100 can include a second wiper 130 in some cases. If provided, the second wiper 130 can be of a similar configuration as the first wiper 112. The second wiper 130 can be a mirror image configuration such that an outer periphery 122 thereof flares toward the axis A. The second wiper 130 can include or be configured as a rubber ring member. The material of the rubber ring member can be resilient to press against a portion of the outer surface 56 of the first boss 54 spaced away from the location of the first wiper 112. Thus, a first bearing assembly 100 with both the first wiper 112 and the second wiper 130 can be equipped to exclude matter, e.g., dirt and grit, from the first support connection 102, e.g., from the space 110 forming the interface between the first boss 54 and the first bearing assembly 100. A first bearing assembly 100 with both the first wiper 112 and the second wiper 130 can be equipped to exclude matter from the contact point between the first boss 54 and the supporting structure of the fuel tank 52 within the fuel system 50.

The first bearing block assembly 90 provides convenience in assembling the fuel system 50 including the first bearing block assembly 90. For example, the separability of the first block portion 92A from the second block portion 92B enables the first bearing assembly 100 to be inserted into the inner periphery 96 in the space between the block portions 92A, 92B. When separated, the first and second block portions 92A, 92B have a "C" shape profile. The "C" shape refers to the first and second block portions 92A, 92B having a first side facing away from the inner periphery 96 with a second side and a third side disposed opposite to each other and at opposite ends of the first side, similar to the block members 68 discussed above. This structure allows the ring member of the first bearing assembly 100 to be continuous which provides a more rigid structure. A continuous solid structure ring member can be more easily handled and may be more rugged with a longer service life.

Figure 3B:
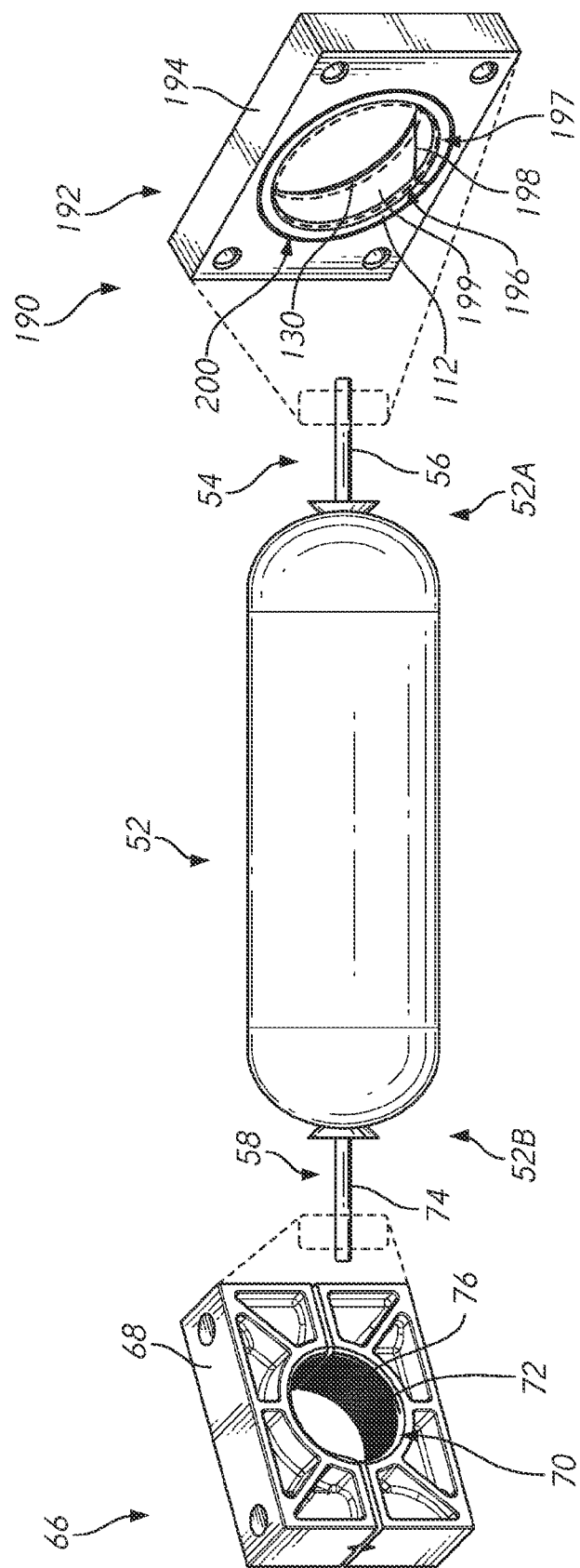

FIG. 3B shows another embodiment of a bearing block assembly 190 that provides other advantages. The assembly of FIG. 3B can be the same as the assembly of FIG. 3A except as described differently below. The first bearing block assembly 190 has a monolithic block component 192. The fuel system 50 can be formed by including the first bearing block assembly 190, e.g., by supporting the first bearing block assembly 190 with the frame 64. The block component 192 can include an outer periphery 194 coupled to the frame 64. The block component 192 can include an inner periphery 196 configured to be disposed around the first boss 54. The inner periphery 196 can be sized to surround the outer surface 56 of the first boss 54 while also providing a space for a support connection 200. The support connection 200 can include a first inner portion 204 that can comprise an assembly. The first inner portion 204 can include a bearing assembly 197 that can include a ring member 199 that has a seam 198 that facilitates placement of the first inner portion 204 within the inner periphery 196. The inner periphery 196 can include a concave channel that can receive a convex outer surface of the ring member 199 of the bearing assembly 197. The convex outer surface can be similar to the convex outer surface 101 of the first bearing assembly 100. The convex outer surface can be split at least at one location such that the ring member 199 of the bearing assembly 197 can be inserted into the inner periphery 196. The bearing assembly 197 can include one or more of the first wiper 112 and the second wiper 130. FIG. 3B shows that ring member 199 can be coupled with both the first wiper 112 and the second wiper 130.

The integration of the first wiper 112 and/or the second wiper 130 into the ring member 199 of the bearing assembly 197 can be similar to that of the first bearing assembly 100. For example, one or more of the first recess 116 and the second recess 134 can be provided in the ring member 199. The first wiper 112 and/or the second wiper 130 can be coupled with the recesses in a suitable manner, e.g., by an adhesive connection to one or more surfaces of the recesses.

The first bearing block assembly 190 can be incorporated into fuel system assembly similar to the fuel system 50. The continuous uninterrupted configuration of the block component 192 provides more rigid support for the first boss 54 in some configurations. Also, the assembly of the fuel system 50 including the first bearing block assembly 190 is simplified in not requiring the connection of two separate block components.

Figure 8:
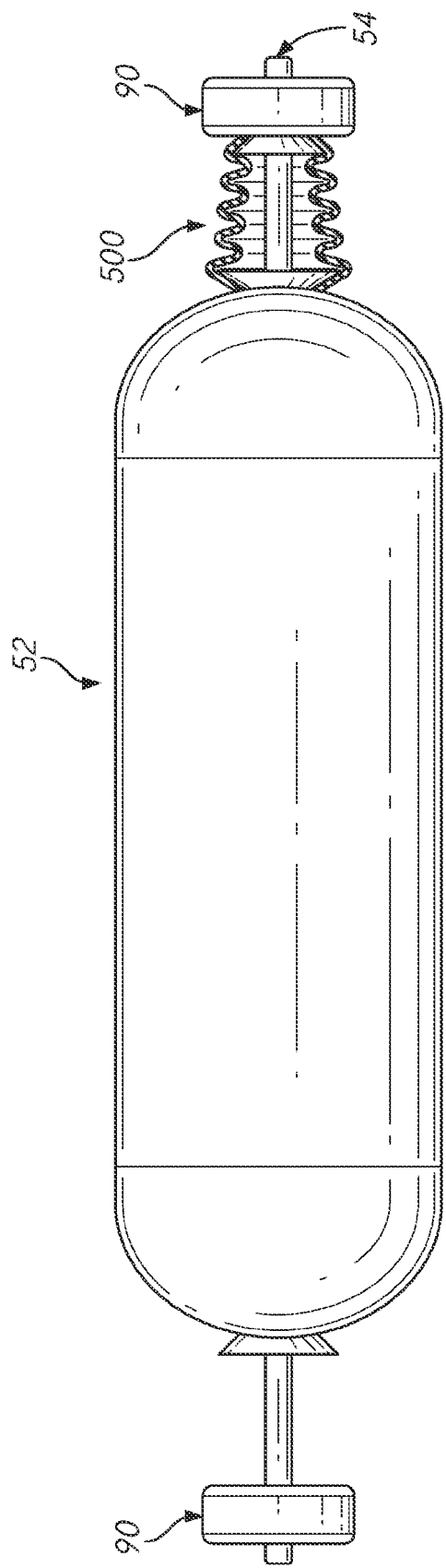
FIG. 8 is a schematic views of a fuel tank and mounting block assembly that can be used to support the fuel tank while excluding debris from the assembly.

In some embodiments, the fuel system 50 includes a bellows assembly 500. A bellows assembly 500 can include two clamps 502 and a sheath or cover 504. The cover 504 extends from one clamp 502 to the other, forming a hollow center 506. The clamp 502 can attach the bellows assembly 500 to the fuel tank 52 and the bearing block 66, 90, 190. The clamps 502 attach the bellows assembly 500 to the fuel tank 52 or bearing block 66, 90, 190 by exerting a clamping force at a connecting point 508. The connecting point 508 can be a ferrule or lip on the fuel tank 52 and/or bearing block 66, 90, 190. In some embodiments, there is no connecting point 508 and the clamps 502 connect directly to the first or second boss 54, 58. The bellows assembly 500 can simultaneously connected to two connecting points 508, such as the connecting point 508 attached to fuel tank 52 and the connecting point 508 attached to the bearing block 66, 90, 190. In FIG. 8, the cover 504 covers a section of the first boss 54 that extends between the fuel tank 52 and the bearing block 66, 90, 190.

In some embodiments, the bellows assembly 500 includes two latches instead of two clamps 502. In some embodiments, the clamps 502 are configured as ratcheting members, similar to a hose clamp. In some embodiments, the cover 504 is made from flexible material, such as natural or synthetic fabric, rubber, silicone, neoprene, nitrile rubber, PTFE, or other plastics. This flexible material allows the cover 504 to expand or contract, which thus increases or decreases the overall length of the cover 504. In some embodiments, the cover 504 has a ribbed outer surface. The ribbed outer surface allows the hollow center 506 to maintain about a steady inner circumference while the cover 504 expands or contracts.

In some embodiments, the fuel system 50 can include two or more sets of bellows assemblies 500, e.g., one for each boss 54, 58. In some embodiments, the fuel system 50 can include one of bellow assembly 500 for a single boss 54, 58. In some embodiments, the bellows assembly 500 is used in combination with a bearing block 66, 90, 190.

Figure 10:
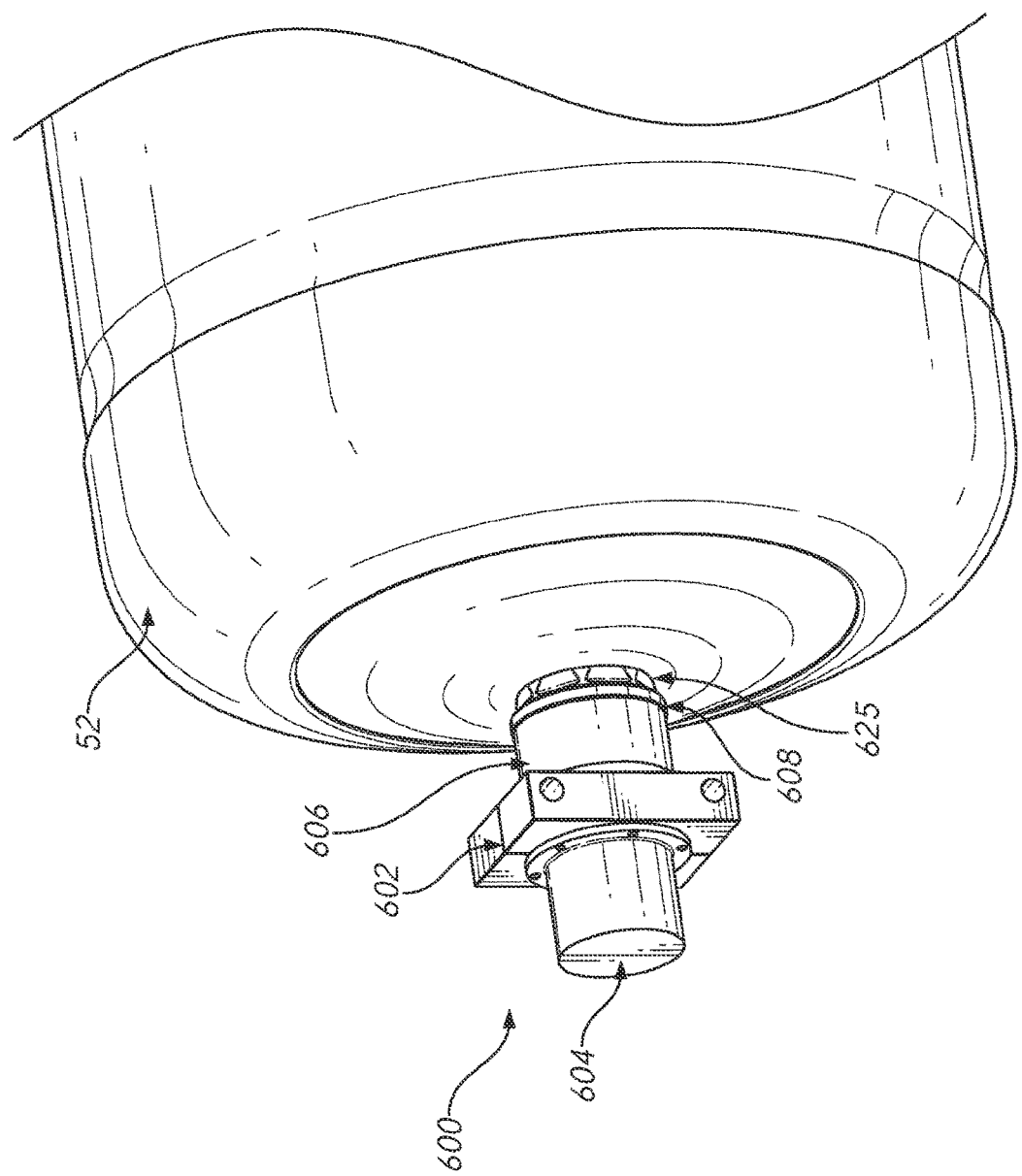
FIG. 10 is a perspective view of an embodiment of a fuel tank and mounting block assembly that can mitigate and even exclude debris from an interface between a fuel tank boss and a bearing of a mounting block assembly.
Figure 11:
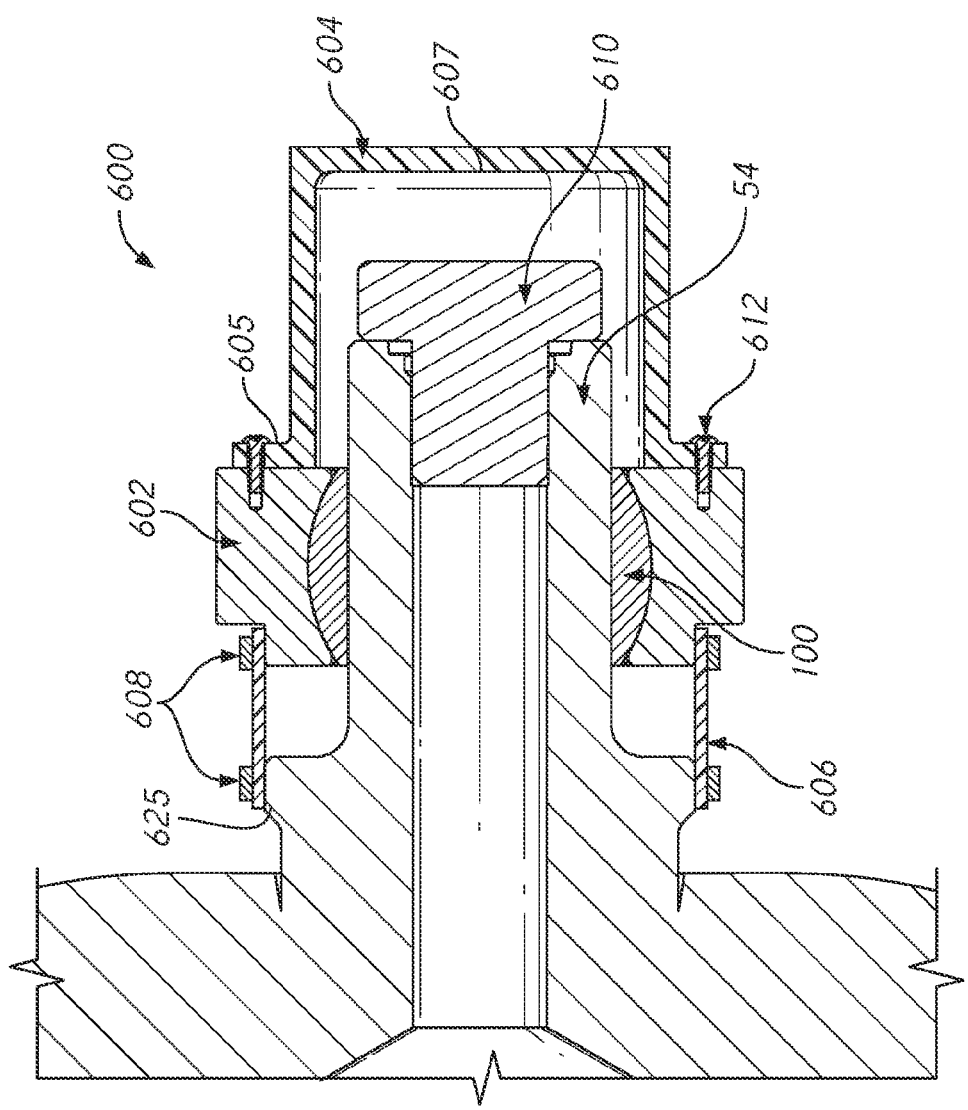
FIG. 11 is a cross-sectional view of a neck mount support assembly that includes an end cap and a cover to mitigate debris ingress from the outboard and inboard sides respectively.

FIGS. 10-12C show another embodiment of a bearing block assembly 600 for use with the fuel system 50. The bearing block assembly 600 can be similar to the bearing block assemblies described elsewhere herein, the disclosure of which can supplement the disclosure hereinbelow. The disclosure of the bearing block assembly 600 can supplement the other bearing block assemblies described herein. The bearing block assembly 600 can permit some movement between the first boss 54 and the bearing block assembly 600, while also reducing the ingress of debris onto the first boss 54. The bearing block assembly 600 can exclude ingress of debris from one or both of an outboard and an inboard side. The bearing block assembly can include an inner periphery 620, which can be disposed around the first boss 54. The inner periphery 620 provides a bearing support space for supporting the first bearing assembly 100, which actually contacts the first boss 54. As discussed above, the first bearing assembly 100 includes one or more dust wipers. In variations more or fewer wipers can be provided. In one embodiment the bearing block assembly 600 can be provided without any dust wipers in the interface between the boss 54 and the bearing surface of the assembly 100, as shown in FIG. 11. The bearing block assembly 600 can be supported in the enclosure 53. For example, the bearing block assembly 600 can be coupled with the mounting brackets 51 directly or through the frame 64.

Figure 12A:
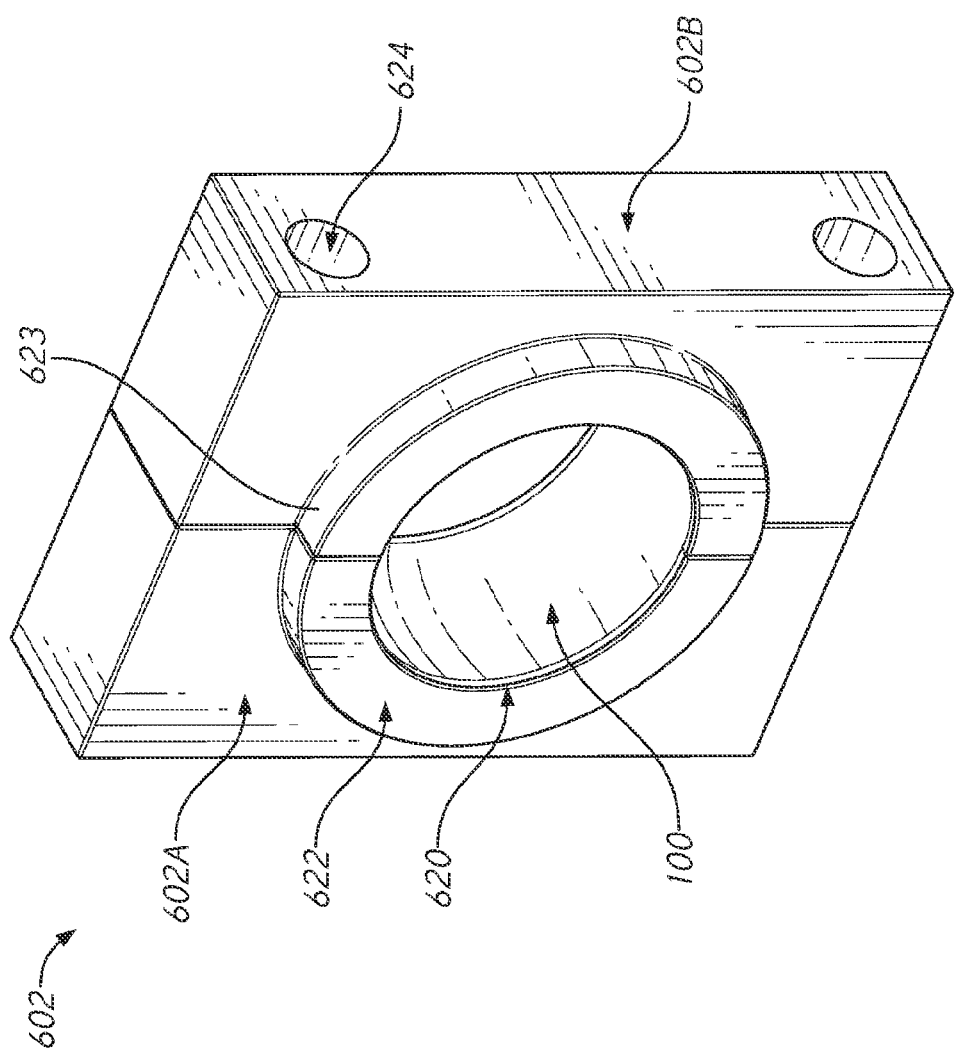
FIG. 12A is a perspective view of an inboard side of one embodiment of a mounting block.
Figure 12C:
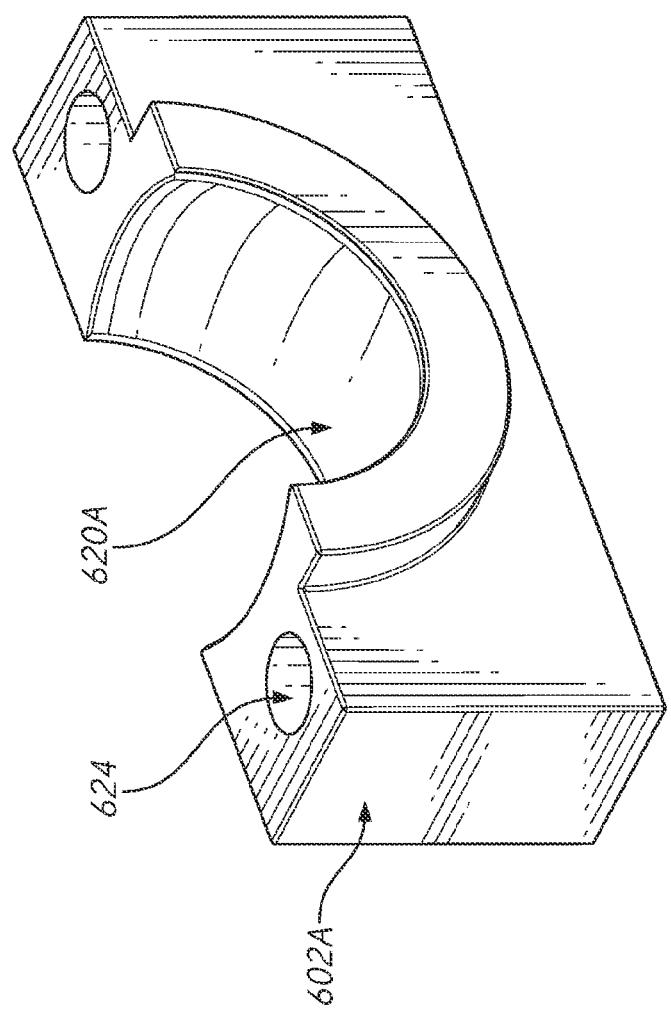
FIG. 12C is a perspective view of an inboard side of a portion of the mounting block shown in FIG. 12A.

As shown in FIGS. 10 and 11, the bearing block assembly 600 can include a bearing block 602. FIGS. 12A-12C show that the bearing block 602 can include a first block portion 602A and a second block portion 602B. The block portions 602A, 602B can be separable in a manner similar to the rigid block member 68 of the fixed bearing block assembly 66 and the first bearing block 92 of first bearing block assembly 90. The first block portion 602A can be lifted off of or separated from the second block portion 602B to provide access to an inner periphery 620 of the block portions 602A, 602B. The inner periphery 620 can be shaped and sized (e.g., diameter, length) in a variety of different ways. For instance, the inner periphery 620 can be circular, triangular, rectangular, pentagonal, hexagonal and octagonal. The inner periphery 620 can be shaped in many other configurations other than those previously listed. A bearing assembly 100 can be placed in the inner periphery 620 to provide support for the first boss 54. The bearing assembly 100 can be secured in the inner periphery 620 in any suitable manner, such as by being received in a channel therein. In some embodiments, the bearing assembly 100 can be secured in place by a fastener, pin and key, latch, or other connector. In other embodiments, the bearing assembly can be secured in place through a more permanent method, such as through welding or bonding. In various embodiments, the shape and dimensions (e.g., diameter, length) of the bearing assembly 100 may be configured to secure to the inner periphery 602. For example, where the intersection of the inner periphery 620 is a circle, the shape of the bearing assembly 100 may resemble a circle. Where the intersection of the inner periphery 602 is a rectangle, the shape of the outer periphery of the bearing assembly 100 may resemble a rectangle.

The bearing block 602 can include a ridge 622. The ridge 622 can be formed on one or two sides of the first block portion 602A and the second block portion 602B. The ridge 622 can form a raised surface on a side of the bearing block 602. The ridge 622 can be used to connect the bearing block 602 to a structure or can be used to secure a structure to the bearing block 602. For example, a clamp 608 can be placed around the outer edge of the ridge 622 to hold a cover 606 in place. The ridge 622 can include an annular projection on a first or inboard side of the bearing block 620. The ridge 622 can provide a peripheral, e.g., a circumferential, surface 623 providing an area upon which a clamp can apply a compression force. Although the peripheral surface 623 is illustrated as flat, a concave recess can be provided in the peripheral surface 623 to receive or partly receive a portion of a clamp.

The bearing block 602 can include one or more fastener holes 626. The fastener holes 626 can be formed on one or more sides of the first block portion 602A and the second block portion 602B. The fastener holes 626 can be disposed on an outboard side, as shown. In some embodiments, fastener holes 626 can be disposed on inboard and outboard sides of the bearing block portions 602A, 602B. In some embodiments, the fastener holes 626 are through holes that extend through the block portions 602A, 602B. In other embodiments, the fastener holes 626 do not extend completely through the block portions 602A, 602B. The fastener holes 626 can be used to connect the bearing block 602 to a structure or can be used to secure a structure to the bearing block 602. For example, the fastener holes 626 can receive fasteners 612 to secure the end cap 604 to the bearing block 602. The fastener holes 626 can be used to secure the cover 606 in some embodiments.

The bearing block 602 can include through holes 624. The through holes 624 can be formed on one side of the first block portion 602A and the second block portion 602B. The through holes 624 can be used connect the bearing block 602 to a structure. For example, the through holes 624 can be used connect the bearing block 602 to the mounting brackets 51 directly or the frame 64.

The bearing block 602 provides convenience in assembling the fuel system 50 including the bearing block assembly 600. For example, the separability of the first block portion 602A from the second block portion 602B enables the first bearing assembly 100 to be inserted into the inner periphery 620 in the space between the block portions 602A, 602B. When separated, the first and second block portions 602A, 602B can have a "C" shape profile. The "C" shape refers to the first and second block portions 602A, 602B having a first side facing away from the inner periphery 620A with a second side and a third side disposed opposite to each other and at opposite ends of the first side, similar to the block members 68 and 92 discussed above. This structure allows a ring member or other portion or all of the first bearing assembly 100 to be continuous which provides a more rigid structure. A continuous solid structure ring member can be more easily handled and may be more rugged with a longer service life.

FIGS. 10 and 11 show further details of the endcap 604 and the integration thereof into the bearing block assembly 600. The end cap 604 can have a cylindrical shape with an open-ended chamber. The end cap 604 can have an opening on one side of the end cap 604 that leads to the chamber. This open-ended chamber allows for the end cap 604 to be placed around objects. For example, the end cap 604 can be placed around the first boss 54. This open-ended chamber can have a closed end at an inside surface 607 opposite to the opening to mitigate or exclude dust or debris from entering the space in the chamber. The end cap 604 can have one or more fastener holes, which allow for the end cap 604 to connect to a structure or can be used to secure a structure to the end cap 604. For example, the end cap 604 can be fastened to a side of the bearing block 602. The fastener holes can be disposed on a radially outwardly extending annular flange 605. An inboard side of the flange 605 can make contact with outside surfaces of the block portions 602A, 602B.

As shown in FIGS. 10 and 11, the bearing block assembly 600 can include a cover 606. The cover 606 can be a material that can be placed over other components. In some embodiments, the cover 606 can have a hollowed center, which allows for the cover 606 to be slid over other components. For example, the cover 606 can be slid or placed over the first boss 54. The cover 606 can be made from a flexible material, such as natural or synthetic fabric, rubber, silicone, neoprene, nitrile rubber, PTFE, or other plastics. This flexible material allows the cover 606 to expand or contract, which thus increases or decreases the overall length of the cover 606. The cover 606 can be connected to other components through a clamp 608. For example, the cover 606 can be connected to the bearing block 602 and the first boss 54 of the fuel tank 52 with two clamps 608. For example, a first clamp 608 can be disposed on the bearing block 602, e.g., by compression onto the peripheral surface 623, and a second clamp 608 can be disposed on a surface 625 of the first boss 54. The first and second clamps 608 can have the same configuration, e.g., similar to hose clamps in one embodiment.

The bearing block assembly 600 can be used to prevent the ingress of dust and other debris into the inner periphery 620 and the first boss 54. As shown in FIGS. 10 and 11, the bearing block 602, end cap 604, and cover 606 can be used to envelop most of, or all of, the outer surface 56 of the first boss 54. For example, the cover 606 can be used for coverage of the first boss 54 between the connecting point 508 of the fuel tank and the connecting point to bearing block 602, while the end cap can be used to for coverage of the first boss 54 between the bearing block 602 and the end of the first boss 54. As a result of this coverage, the bearing block assembly 600 can greatly limit the amount of debris that can enter into the inner periphery 620. This coverage can also keep the outer surface 56 of the first boss 54 free from debris. The use of wipers 112 in the interface between the bearing block 602 and the boss 54 can further exclude debris from this interface.

Figure 9:
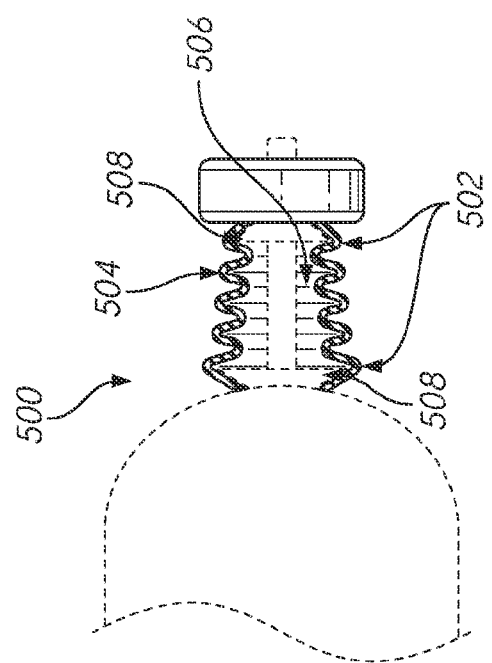
FIG. 9 is a detail view of a portion of a modified embodiment of the fuel tank and mounting block assembly of FIG. 8.

As noted above, the bearing block assembly 600 can permit some movement between the bearing block assembly 600 and the first boss 54. The fuel tank 52 can be somewhat expanded, e.g., elongated, when under pressure in part due to the materials used to form the fuel tank 52. As the fuel tank 52 expands or contracts, the first bearing assembly 100 disposed within the bearing block assembly 600 can allow for first boss 54 to move relative thereto. The cover 606 can expand, e.g., elongate, or contract, e.g., foreshorten, along with the fuel tank 52, which allows for cover 606 to maintain its coverage over the first boss 54. The cover 606 can include a bellows-type member, as discussed above in connection with FIGS. 8-9 or can comprise a material or structure that permits elastic expansion and/or contraction. The chamber of the endcap 604 can be sized so as to allow for the fuel tank 52 to expand without the inside surface 607 of the endcap contacting the first boss 54. For example, the inside surface 607 of the endcap 604 can be spaced away from the end of the first boss 54 or a plug 610 enclosing an access passage in the boss 54 at or beyond the expected travel distance of the first boss 54 or plug 610. Thus, the bearing block assembly 600 can maintain its coverage of the first boss 54 while the fuel tank 52 expands or contracts without interfering with the expected expansion and contraction of the boss 54 and/or the plug 610.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A neck mount support assembly, comprising:
a mounting block assembly configured to support an end of a fuel tank, the end of the fuel tank having a boss, the mounting block assembly comprising:
a first portion;
a second portion separable from the first portion, the first portion and the second portion enclosing a bearing support space configured to receive the boss of the fuel tank; and
a bearing disposed in the bearing support space, the bearing having a support surface configured for sliding support of the boss of the fuel tank at an interface; and
a bellows assembly extending between the mounting block assembly and the fuel tank and configured to cover the boss between the mounting block assembly and the fuel tank.

2. The neck mount support assembly of claim 1, further comprising a wiper disposed adjacent to the support surface of the bearing, the wiper being configured to limit debris from entering the interface between the support surface and the boss.

3. The neck mount support assembly of claim 2, wherein the wiper comprises a rubber ring member having an outer periphery secured in a recess of the bearing and an inner periphery that is smaller than an outer diameter of the boss.

4. The neck mount support assembly of claim 2, wherein the wiper is an outboard dust wiper and wherein the bearing comprises an outboard recess having the outboard dust wiper disposed therein, an inboard dust wiper located between the outboard dust wiper and a fuel containing portion of the fuel tank, and an inboard recess having the inboard dust wiper disposed therein.

5. The neck mount support assembly of claim 1, wherein the bellows assembly comprises:
a first connecting member, the first connecting member configured to connect to the boss near the fuel tank;
a second connecting member, the second connecting member configured to connect to the mounting block assembly; and
a cover, the cover connected to the first connecting member at one end and the second connecting member at an opposite end.

6. The neck mount support assembly of claim 5, wherein the second connecting member is a clamp configured to connect to the mounting block assembly by exerting a clamping force onto a connecting point of the mounting block assembly.

7. The neck mount support assembly of claim 5, wherein the first connecting member is a clamp configured to connect to the boss near the fuel tank by exerting a clamping force onto a ferrule or lip of the fuel tank.

8. The neck mount support assembly of claim 1, further comprising an endcap connected to an outboard side of the mounting block assembly, the endcap comprising an enclosed space configured to accommodate an end of the boss.

9. A neck mount support assembly, comprising:
a mounting block configured to support an end of a fuel tank, the end of the fuel tank having a boss, the mounting block comprising:
a first side facing toward the fuel tank when the mounting block is coupled to the boss;
a second side facing away from the fuel tank when the mounting block is coupled to the boss;
a first portion;
a second portion separable from the first portion, the first portion and the second portion enclosing a bearing support space configured to receive the boss of the fuel tank; and
a bearing disposed in the bearing support space, the bearing having a support surface configured for supporting the boss of the fuel tank at an interface; and
an endcap connected to the second side of the mounting block;
wherein the endcap is configured to limit debris from entering the interface between the support surface and the boss.

10. The neck mount support assembly of claim 9 further comprising a cover connected to a first side of the mounting block, wherein the cover is configured to limit debris from entering the interface between the support surface and the boss.

11. The neck mount support assembly of claim 10, wherein the cover extends between a surface of the boss and an annular ridge located on the first side of the mounting block.

12. The neck mount support assembly of claim 10, wherein the cover is configured to expand axially when the fuel tank expands to maintain protection of the boss.

13. The neck mount support assembly of claim 12, wherein the cover has a bellows structure.

14. The neck mount support assembly of claim 9, wherein the endcap includes:
an open end configured to receive the boss;
a closed end; and
a flange located around the open end, wherein the endcap is fastened to the second side of the mounting block via connectors coupled to the flange.

15. The neck mount support assembly of claim 9, wherein the mounting block further comprises a wiper disposed adjacent to the support surface of the bearing.

16. A fuel system, comprising:
a tank comprising a first boss at one end and a second boss located at an end of the tank opposite the first boss;

a mounting assembly configured to be coupled to a support; and a first bearing block coupled to the mounting assembly, the first bearing block comprising:

a first inner portion comprising a first tank support surface; and a wiper disposed adjacent to the first tank support surface;

a second bearing block coupled to the mounting assembly, the second bearing block comprising a second inner portion comprising a second tank support surface; and wherein the first bearing block being coupled to an outer surface of the first boss at the first tank support surface to form a first support connection and the second bearing block being coupled to an outer surface of the second boss at the second tank support surface to form a second support connection, the first and second support connections supporting the tank on the mounting assembly;

wherein the first bearing block allows the first boss to move relative to the first tank support surface while the tank is coupled to the mounting assembly; and wherein the wiper prevents debris from entering a space disposed between the first tank support surface and the first boss when the first boss moves relative to the first tank support surface.

17. The fuel system of claim 16, wherein the first inner portion of the first bearing block includes a first recess configured to receive the wiper.

18. The fuel system of claim 16, wherein the wiper comprises a rubber ring member having an outer periphery secured in a recess of the first bearing block and an inner periphery that, in a free state, is smaller than an outer diameter of the first boss.

19. The fuel system of claim 16, wherein the wiper is an outboard dust wiper and wherein the first bearing block comprises an outboard recess having the outboard dust wiper disposed therein, an inboard dust wiper located between the outboard dust wiper and a fuel containing portion of the tank, and an inboard recess having the inboard dust wiper disposed therein.

20. The fuel system of claim 16, wherein the mounting assembly includes a frame, a block retaining a bearing, and a C-Shaped block assembly retaining a bearing, the block and the C-shaped block assembly being coupled to the frame.

* * * * *